(12) United States Patent
Kubo et al.

(10) Patent No.: US 6,536,960 B2
(45) Date of Patent: Mar. 25, 2003

(54) IMAGE-SENSING APPARATUS

(75) Inventors: Hiroaki Kubo, Muko (JP); Yasuhiro Morimoto, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/732,198

(22) Filed: Dec. 7, 2000

(65) Prior Publication Data

US 2003/0035652 A1 Feb. 20, 2003

(30) Foreign Application Priority Data

Dec. 15, 1999 (JP) .......................... 11-355676

(51) Int. Cl.[7] .................. G03B 19/12; G03B 13/08; G03B 17/00; H04N 5/225
(52) U.S. Cl. .................. 396/355; 396/356; 396/358; 396/385; 396/447; 348/333.09; 348/341
(58) Field of Search ................. 396/213, 241, 396/355, 356, 358, 385, 386, 447; 348/333.08, 333.09, 341

(56) References Cited

U.S. PATENT DOCUMENTS 4,757,387 A * 7/1988 Saito .......................... 348/342
4,809,076 A 2/1989 Todaka et al. ......... 358/213.19
5,459,511 A 10/1995 Uehara et al. ............... 348/335

FOREIGN PATENT DOCUMENTS

| JP | 10-055023 A | 2/1998 |
| JP | 10-098640 A | 4/1998 |
| JP | 10-108046 A | 4/1998 |

* cited by examiner

Primary Examiner—David M. Gray
Assistant Examiner—Rochelle Blackman
(74) Attorney, Agent, or Firm—Sidley Austin Brown & Wood LLP

(57) ABSTRACT

In a digital camera having a half mirror retractable out of the optical path and an optical viewfinder receiving light reflected from the half mirror, the sensitivity of an image-sensing device is set as specified by the user. When a relatively high sensitivity is specified, an image to be recorded is shot with the half mirror operated as a quick-return mirror, and, when a relatively low sensitivity is specified, an image to be recorded is shot with the half mirror kept in the optical path. A sensitivity that cannot be coped with simply by changing the position of the half mirror is set by adjusting, in conjunction therewith, the output gain of the image-sensing device.

19 Claims, 5 Drawing Sheets

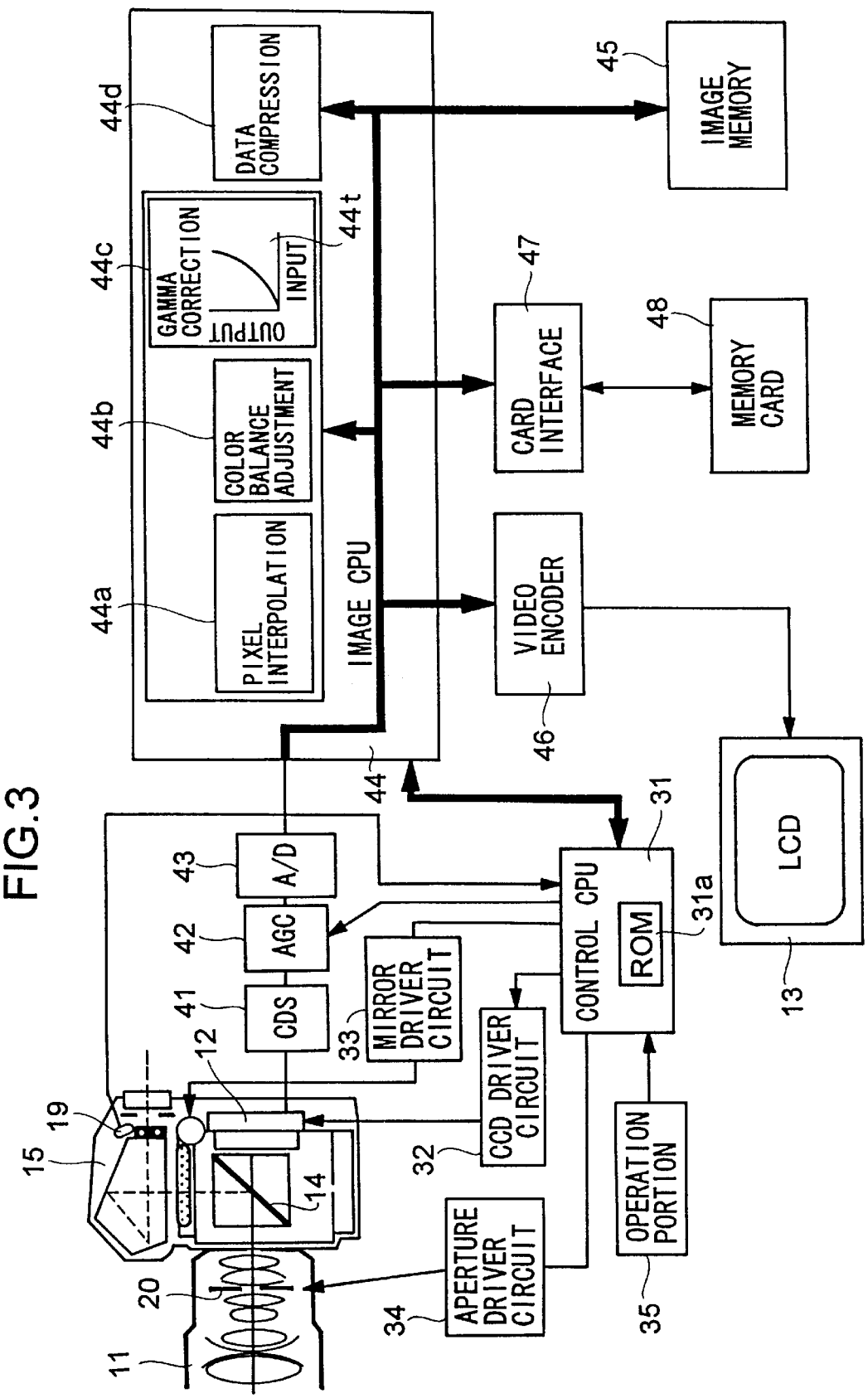

IMAGE-SENSING APPARATUS

This application is based on application No. H11-355676 filed in Japan on Dec. 15, 1999, the entire contents of which are hereby incorporated by reference.

BACKGROUND OF THE INVENTION

1. Field of the Invention

The present invention relates to an image-sensing apparatus, such as a digital camera, and particularly to an apparatus in which the optical path is split by a half mirror so that light from a taking lens is partially directed to an optical viewfinder.

2. Description of the Prior Art

Generally, a digital camera is equipped with a display device such as a liquid crystal display device, and this display device is used both to display a playback of an image shot and stored previously and to display an image just being shot. This enables the user to determine picture composition and confirm focus condition while viewing a "live view", i.e. the image just being shot, that is displayed on the display device. Thus, the display device functions as a video viewfinder.

Some digital cameras are equipped with, in addition to a display device, an optical viewfinder. Digital cameras equipped with an optical viewfinder divide into a separate type, in which light is introduced to the viewfinder without being passed through a taking lens, and a single-lens-reflex (SLR) type, in which the light having passed through a taking lens is reflected so as to be introduced to the viewfinder. Whereas the separate type suffers parallax between the viewfinder and the taking lens, the SLR type has the advantage of intrinsically being free of parallax.

The SLR type requires a prism to be disposed in the optical path from the taking lens to an image-sensing device so as to reflect a part and transmit the other part of the light having passed through the taking lens, and requires also a pentaprism for directing the reflected light to the eye of the user in such a way as to permit the user to observe an erect image. In this arrangement, the optical viewfinder and the video viewfinder can be used at the same time. However, only part of the light having passed through the taking lens reaches the image-sensing device all the time, and therefore light is used inefficiently in shooting.

As is well known, in an SLR-type camera that shoots by exposure of silver-halide film, it has been customary to dispose a total-reflection mirror obliquely in the optical path from the taking lens to the film in such a way that the mirror can be rotated out of the optical path. Until immediately before shooting, i.e. exposure of film, the mirror is kept in the optical path so that the incoming light is reflected toward the pentaprism. Only at the moment of shooting is the mirror retracted out of the optical path so that the incoming light is directed to the film, and, immediately after shooting, the mirror is brought back in the optical path. This type of mirror is called a quick-return mirror.

Digital cameras equipped with such a quick-return mirror are already in practical use, producing bright images despite using an optical viewfinder. However, in this arrangement, while the total-reflection mirror is placed in the optical path to permit the use of the optical viewfinder, no light reaches the image-sensing device, and thus the display device cannot be used as a viewfinder.

One way to overcome this inconvenience is to equip digital cameras with a half mirror that acts as a quick-return mirror. This permits, whether the half mirror is placed in or retracted out of the optical path, the incoming light to reach the image-sensing device, and thus makes both shooting and display possible at any time. While the half mirror is placed in the optical path, the optical viewfinder can be used as well. On the other hand, when an image to be recorded is shot, the half mirror is retracted out of the optical path so that all the light from the taking lens is used for shooting.

As a result of this improvement, digital cameras have come to offer, in addition to their own features, operability close to that of cameras that shoot by exposure of silver-halide film (hereinafter called silver-halide cameras). However, whereas a silver-halide camera provides varying sensitivity according to the film loaded therein, a digital camera has an image-sensing device fixed therein, and therefore intrinsically provides constant sensitivity. In this respect, digital cameras greatly differ from silver-halide cameras, offering less flexibility in terms of settings for exposure control such as the aperture value and the shutter speed.

One way to overcome this inconvenience is to vary effective sensitivity by varying the gain of the output signal of the image-sensing device. However, when extremely intense light is incident on the image-sensing device, the output thereof becomes saturated, in which case, even if the gain is lowered, it is impossible to reproduce highlight areas properly. One way to avoid this is to insert an ND filter in the optical path from the taking lens to the image-sensing device so as to reduce the very amount of light incident on the image-sensing device and thereby lower apparent sensitivity. The user, by using these sensitivity switching functions, can control exposure to a certain extent.

In fact, in some digital cameras, the brightness of the subject is detected and, when the subject is found to be too bright to be shot with proper exposure, an ND filter is automatically inserted in the optical path.

However, equipping a camera with an ND filter and a mechanism for its insertion makes the construction of the camera as a whole unduly large. Moreover, disposing an ND filter in front of a prism or half mirror, i.e. an optical member that splits the optical path, makes the image observed through an optical viewfinder unduly dim.

SUMMARY OF THE INVENTION

An object of the present invention is to provide an image-sensing apparatus that has an optical member retractable out of the optical path and that permits flexible exposure control despite being compact with minimum degradation of image quality.

Another object of the present invention is to provide, in an image-sensing apparatus having an optical member retractable out of the optical path, a method for flexibly controlling the exposure of an image-sensing device and a method for driving such an optical member in a manner suitable for exposure control.

To achieve the above objects, according to one aspect of the present invention, an image-sensing apparatus is provided with: a taking lens; an image-sensing device for shooting an image by receiving light from the taking lens; an optical member that can be moved between an intercepting position in which the optical member crosses the optical path from the taking lens to the image-sensing device and a retracted position in which the optical member lies off the optical path; a sensor for measuring the brightness of a subject; an operation member operated by a user; a driver for positioning the optical member in the intercepting or retracted position according to an instruction fed in through the operation member; and a controller for adjusting the amount of exposure of the image-sensing device according to the output of the sensor and the position of the optical member.

In this image-sensing apparatus, according to an instruction fed in by the user operating the operation member, the optical member is positioned in the intercepting or retracted position so that, according to the position of the optical member, the amount of light incident on the image-sensing device is varied and thereby the apparent sensitivity of the image-sensing device is switched. While the controller controls the amount of exposure of the image-sensing device, the controller does so with consideration given not only to the brightness of the subject but also to the position of the optical member, and therefore the instruction from the user is reflected in the amount of exposure of the image-sensing device thus adjusted. This makes flexible exposure control possible. The controller may vary either or both of the aperture value and the electronic shutter speed. As the optical member, a half mirror is used, for example.

The image-sensing apparatus may be further provided with an adjuster for adjusting the intensity of a signal representing an image shot according to the position of the optical member so that the controller adjusts the amount of exposure of the image-sensing device according to the intensity of the signal adjusted by the adjuster.

In this arrangement, the adjuster, by making the intensity of the signal representing the image shot higher or lower, can vary the effective sensitivity of the image-sensing device. Since the adjuster adjusts the intensity of the signal according to the position of the optical member, both the switching of the apparent sensitivity of the image-sensing device and the varying of the effective sensitivity thereof are performed according to the instruction from the user. Moreover, the controller adjusts the amount of exposure of the image-sensing device with consideration given also to the signal intensity. This makes more flexible exposure control possible.

Here, the adjuster may be so configured as to make the intensity of the signal higher when the optical member is in the retracted position than when it is in the intercepting position. This makes it possible to set the sensitivity of the image-sensing device to be higher in the retracted position and lower in the intercepting position than when the signal intensity is kept constant. That is, it is possible to make the range of sensitivity of the image-sensing device wider than when simply the position of the optical member is changed.

Alternatively, the adjuster may be so configured as to make the intensity of the signal lower when the optical member is in the retracted position than when it is in the intercepting position. This makes it possible to set the sensitivity of the image-sensing device to be lower in the retracted position and higher in the intercepting position than when the signal intensity is kept constant. Thus, it is possible to obtain medium sensitivity between the maximum and minimum sensitivity obtained when simply the position of the optical member is changed.

The image-sensing apparatus may be further provided with an optical viewfinder for offering a visible image by receiving light reflected from the optical member when it is in the intercepting position. This makes it possible to offer an optical image of the subject when the optical member is in the intercepting position.

According to another aspect of the present invention, in an image-sensing apparatus having a taking lens, an image-sensing device for shooting an image by receiving light from the taking lens, and an optical member that can be moved between an intercepting position in which the optical member crosses the optical path from the taking lens to the image-sensing device and a retracted position in which the optical member lies off the optical path, a method for controlling the amount of exposure of the image-sensing device includes: a step of measuring the brightness of a subject; a step of receiving an instruction from outside; a step of positioning the optical member in the intercepting or retracted position according to the instruction received from outside; and a step of setting the amount of exposure of the image-sensing device according to the measured brightness of the subject and the position of the optical member.

This method permits the user to feed in an instruction to move the optical member to the intercepting or retracted position. In addition, since the amount of exposure of the image-sensing device is determined according to both the brightness of the subject and the position of the optical member, it is possible to reflect the user's intention in the adjustment of exposure.

According to still another aspect of the present invention, an image-sensing apparatus is provided with: a taking lens; an image-sensing device for shooting an image by receiving light from the taking lens; an optical member that can be moved between an intercepting position in which the optical member crosses the optical path from the taking lens to the image-sensing device and a retracted position in which the optical member lies off the optical path; a sensor for measuring the brightness of a subject; and a driver for positioning the optical member in the intercepting position when the brightness of the subject measured by the sensor is equal to or higher than a predetermined level and for positioning the optical member in the retracted position when the brightness of the subject measured by the sensor is lower than the predetermined level.

In this image-sensing apparatus, the amount of light incident on the image-sensing device is automatically switched according to the brightness of the subject. By keeping the optical member in the retracted position, it is possible to use all the light from the subject for shooting. This makes it possible to control exposure flexibly even when the subject is dim. For example, it is possible to stop down the aperture stop further. On the other hand, by positioning the optical member in the intercepting position, it is possible to reduce the amount of light reaching the image-sensing device. This makes it possible to control exposure flexibly even when the subject is very bright. For example, it is possible to open the aperture closer to the fully open aperture. As the optical member, a half mirror is used, for example.

The image-sensing apparatus may be further provided with a display for notifying the user of a change in the position of the optical member. This permits the user to confirm in which position the optical member is when shooting is performed and thereby prevent faulty adjustment of the amount of exposure. The display may be used also to display an image shot.

According to a further aspect of the present invention, in an image-sensing apparatus having a taking lens, an image-sensing device for shooting an image by receiving light from the taking lens, and an optical member that can be moved between an intercepting position in which the optical member crosses the optical path from the taking lens to the image-sensing device and a retracted position in which the optical member lies off the optical path, a method for driving the optical member includes: a step of measuring the brightness of a subject; a step of positioning the optical member in the intercepting position when the measured brightness of the subject is equal to or higher than a predetermined level; and a step of positioning the optical member in the retracted position when the measured brightness of the subject is lower than the predetermined level.

By this method, when the subject is dim, all the light from the taking lens is directed to the image-sensing device, and, when the subject is bright, only part of the light from the taking lens is directed to the image-sensing device. This makes it possible not only to shoot a dim subject with proper brightness but also to shoot a very bright subject with proper brightness. In addition, since the position of the optical member is changed automatically according to the brightness of the subject relative to the predetermined level, the user does not need to perform any extra operation for that.

BRIEF DESCRIPTION OF THE DRAWINGS

This and other objects and features of the present invention will become clear from the following description, taken in conjunction with the preferred embodiments with reference to the accompanying drawings in which:

FIG. 3 is a block diagram showing the circuit configuration of the digital cameras of the first and second embodiments;

DESCRIPTION OF THE PREFERRED EMBODIMENTS

Figure 1:
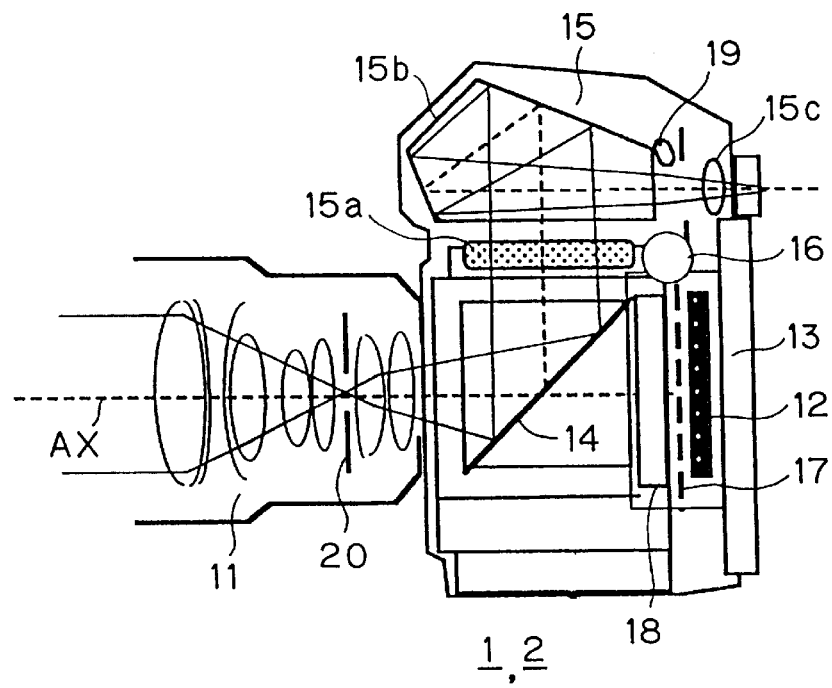
FIG. 1 is a sectional view showing the optical construction of the digital cameras of a first and a second embodiment of the invention.
Figure 2:
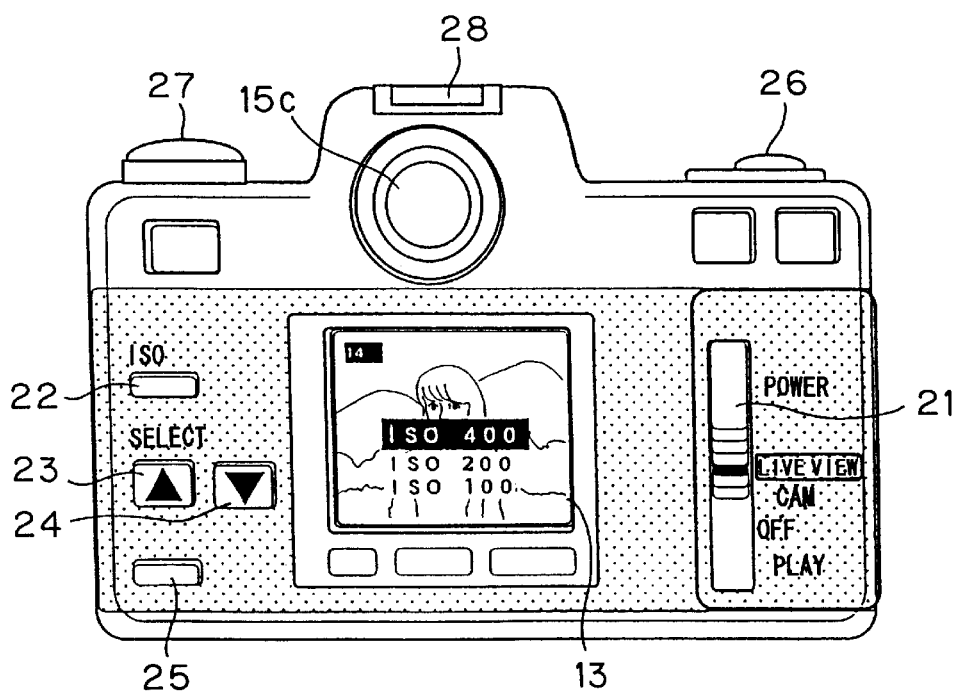
FIG. 2 a rear view of the digital camera of the first embodiment.

Hereinafter, digital cameras embodying the present invention will be described with reference to the drawings. FIG. 1 shows a sectional view of the digital camera 1 of a first embodiment of the invention, and FIG. 2 shows a rear view thereof.

As shown in FIG. 1, the digital camera 1 has a taking lens 11, a charge-coupled device (CCD) 12 serving as an image-sensing device, a liquid crystal display (LCD) 13, a half mirror 14, and an optical viewfinder 15. The taking lens 11 images the light from a subject on the light-receiving surface of the CCD 12. The CCD 12 is disposed perpendicularly to the optical axis Ax of the taking lens 11, and serves to shoot an image by converting the light from the taking lens 11 into an electric signal. The shooting of an image by the CCD 12 is performed repeatedly at substantially regular time intervals. The LCD 13 is disposed on the back of the digital camera 1, and serves to display the image shot by the CCD 12 and messages to the user.

The half mirror 14 is disposed between the taking lens 11 and the CCD 12. The half mirror 14 has, at the upper end thereof, a rotation axis, which lies perpendicular to the optical axis Ax of the taking lens 11 and about which the half mirror 14 rotates between an intercepting position, in which the half mirror 14 crosses the optical path from the talking lens 11 to the CCD 12, and a retracted position, in which the half mirror 14 is retracted out of the optical path. The half mirror 14, when in the intercepting position, crosses the optical axis Ax at 45° and, when in the retracted position, lies substantially parallel to the optical axis Ax. The half mirror 14 is designed to have a transmittance of approximately 60%. The half mirror 14 is driven by an actuator 16 provided near the upper end thereof.

The optical viewfinder 15 is composed of a focusing screen 15a, a pentaprism 15b, and an eyepiece lens 15c. The screen 15a is disposed parallel to the optical axis Ax of the taking lens 11, and serves to image the light reflected from the half mirror 14 when the half mirror 14 is in the intercepting position. The distance from the intersection between the optical axis Ax and the half mirror 14 to the imaging surface of the screen 15a is made equal to the distance from the same intersection to the light-receiving surface of the CCD 12. Thus, these two surfaces are located at optically equivalent positions. By observing the image formed on the screen 15a through the eyepiece lens 15c and the pentaprism 15b, the user can observe an erect image equivalent to the image formed on the CCD 12.

Immediately in front of the CCD 12, a focal-plane shutter 17 is disposed that switches between a state in which light is allowed to reach the CCD 12 and a state in which light is shut off therefrom. Between the half mirror 14 and the shutter 17, a low-pass filter 18 is disposed that eliminates high-frequency components. Inside the optical viewfinder 15, a photometric device 19 is disposed that measures the amount of light from the prism 15b. The amount of light measured by the photometric device 19 is used to control the exposure of the CCD 12, and, in flash shooting, it is used also to achieve automatic light adjustment. Near the pupil of the taking lens 11, an aperture stop 20 is disposed that restricts the diameter of the light beam and thereby controls the exposure of the CCD 12.

As shown in FIG. 2, on the back of the digital camera 1 are arranged, in addition to the LCD 13, a number of switches including a slide-type switch 21 and four push-type switches 22, 23, 24, and 25. On the top of the digital camera 1 are arranged a release button 26, a dial 27, and a receptacle 28 that permits a flash device to be attached thereto.

The switch 21 is used to turn on and off the supply of electric power and to set the operation mode. The digital camera 1 operates in a shooting mode, in which an image is shot by the CCD 12 and the shot image is recorded on a recording medium as requested by the user, or in a playback mode, in which a previously recorded image is reproduced and displayed on the LCD 13. In the shooting mode, the shooting of an image and the display of the shot image on the LCD 13 may be repeated at regular time intervals (for example, ⅓0 seconds).

This makes it possible to offer a "live view" display capability whereby the target subject is displayed in a form like a moving video picture.

When the switch 21 is in a position marked "OFF", no power is supplied, and thus the digital camera 1 remains out of operation. With the switch 21 in a position marked "PLAY", the digital camera 1 operates in the playback mode. With the switch 21 in a position marked "LIVE VIEW", the digital camera 1 operates in the shooting mode with a live view, and, with the switch 21 in a position marked "CAM", the digital camera 1 operates in the shooting mode without a live view.

The sensitivity of the CCD 12 can be varied in a plurality of steps, and an instruction to switch sensitivity is fed in through operation of the switches 22, 23, and 24. When the switch 22 is operated, possible choices of sensitivity are displayed on the LCD 13, with the currently specified one displayed in a different manner than the others. In this state, by operating the switch 23 or 24, another choice of sensitivity can be selected, and then, by operating the switch 22 again, the selected choice of sensitivity is stored. In this way, desired sensitivity is specified.

Here, the sensitivity of the CCD 12 can be varied in five steps from ISO 50 to ISO 800. Although FIG. 2 does not show sensitivity ISO 800 and ISO 50, by operating the switch 23 or 24 when ISO 400 or ISO 100 is selected, the display of possible choices of sensitivity can be scrolled one line up or down to show ISO 800 or ISO 50.

The switching of sensitivity is effected by changing the position of the half mirror 14 and through processing, described later, of the signal from the CCD 12. At sensitivity ISO 50 or ISO 100, an image to be recorded is shot with the half mirror 14 kept in the intercepting position, and, at sensitivity ISO 200 to ISO 800, an image to be recorded is shot with the half mirror 14 operated as a quick-return mirror.

The release button 26, when pressed halfway, produces a signal S1, and, when pressed fully, additionally produces a signal S2. The digital camera 1 adopts automatic focusing whereby the focus of the taking lens 11 is adjusted on the basis of the image shot by the CCD 12. The signal S1 requests starting of automatic focusing. The signal S1 also requests starting of calculation of the aperture value of the aperture stop 20 and the photoelectric conversion time (electronic shutter speed) of the CCD 12 on the basis of the output of the photometric device 19 in order to control the exposure of the CCD 12.

The signal S2 requests recording of the image being shot. When the signal S2 is issued, first, the aperture value and the electronic shutter speed are set at the values that have been calculated previously. In addition, according to the stored sensitivity of the CCD 12, the half mirror 14 is driven to the retracted position. Then, the image shot on completion of these operations is recorded.

The digital camera 1 uses as an image recording medium a removable memory card. An image may or may not be compressed before being recorded. The switch 25 is used to switch between compressed and non-compressed recording of images. Exposure can be controlled in one of three, i.e. aperture-priority, shutter-priority, and program, modes. The dial 27 is used to select among these modes.

FIG. 3 schematically shows the circuit configuration of the digital camera 1. The digital camera 1 has a CPU 31, a CCD driver circuit 32, a mirror driver circuit 33, an aperture driver circuit 34, an operation portion 35, a CDS (correlative double sampling) circuit 41, an AGC (automatic gain control) circuit 42, an A/D converter 43, a CPU 44, an image memory 45, a video encoder 46, and a card interface 47.

The CPU 31 controls the operation of the entire digital camera 1. Hereinafter, the CPU 31 is called the control CPU. The CCD driver circuit 32 produces a clock that is used as the basis of operation timing, and feeds it to the CCD 12 so as to control the operation of the CCD 12 by instructing it to start photoelectric conversion, output the electric charges accumulated by photoelectric conversion, and the like. The mirror driver circuit 33 instructs the actuator 16 to control the movement of the half mirror 14. The aperture driver circuit 34 controls, through a driving mechanism (not shown), the aperture value (aperture diameter) of the aperture stop 20. These are controlled according to commands from the control CPU 31.

The operation portion 35 includes various operation members such as the switches 21 to 25, the release button 26, and the dial 27, and serves to transmit the operation performed by the user to the control CPU 31.

The CDS circuit 41 reduces the noise in the analog signal output from the CCD 12, and the AGC circuit 42 adjusts, according to the gain thereof, the levels of all the signals from the CDS circuit 41. The A/D converter 43 converts the analog signal from the AGC circuit 42 into 10-bit digital signals.

The gain of the AGC circuit 42 is set by the control CPU 31. The control CPU 31 sets the gain of the AGC circuit 42 according to the specified sensitivity of the CCD 12 with consideration given to the position and the transmittance (60%) of the half mirror 14. Specifically, if it is assumed that the gain equals 1 at sensitivity ISO 50, then the gain is set to be equal to 2 at ISO 100, 2.4 (4×0.6) at ISO 200, 4.8 at ISO 400, and 9.6 at ISO 800. The control CPU 31 has a ROM 31a, and has the transmittance of the half mirror 14, which it requires to calculate the gain, stored in this ROM 31a.

Here, since the transmittance of the half mirror 14 is assumed to be 60%, the gain at ISO 200 differs from the gain at ISO 100. However, if the transmittance of the half mirror 14 is assumed to be 50%, the gain at ISO 200 is identical with the gain at ISO 100. If the transmittance of the half mirror 14 is assumed to be, for example, 40%, the gain at ISO 200 is set to be equal to 1.6 (4×0.4).

The CPU 44 processes the obtained digital signals so as to produce image data representing an image. Hereinafter, the CPU 44 is called the image CPU. The signals output from the A/D converter 43 are stored in the image memory 45 for a while. The image CPU 44 reads these signals from the image memory 45, and performs pixel interpolation, color balance adjustment, and gamma correction so as to produce image data.

Pixel interpolation 44a is performed to interpolate the signals from the three-color, i.e. R, G, and B, pixels arranged alternately on the CCD 12. Color balance adjustment 44b is performed to correct individually the gains of the interpolated three-color signals and thereby achieve correct reproduction of the colors of the subject. Gamma correction 44c is performed to subject the gain-adjusted signals to non-linear conversion using a look-up table 44t and thereby obtain gradation fit for the LCD 13. The image CPU 44 stores as image data the signals having undergone these operations once again in the image memory 45.

The image CPU 44 reads the image data from the image memory 45 and feeds it to the video encoder 46. The video encoder 46 then encodes the received image data into a format complying with the NTSC system, and feeds the encoded image data to the LCD 13 to display it as an image thereon.

The memory card 48 stores the image data. The card interface 47 writes data to and reads data from the memory card 48. On receiving an instruction from the control CPU 31 in response to the signal S2, the image CPU 44 reads the image data from the image memory 45, and feeds it to the card interface 47 to record it on the memory card 48. If the control CPU 31 is requesting data compression, before the image data is recorded on the memory card 48, the image CPU 44 performs data compression 44d on the image data by a method complying with JPEG.

In the playback mode, in response to an instruction from the control CPU 31, the image CPU 44 reads the image data stored on the memory card 48 through the card interface 47, decompresses the image data if necessary, and stores it in the image memory 45. Then, the image CPU 44 reads this image data, and feeds it to the video encoder 46 to display it on the LCD 13.

To control exposure when an image to be recorded is shot, the control CPU 31 determines the aperture value of the aperture stop 20 and the electronic shutter speed of the CCD 12 according to the known APEX system with consideration given to the brightness of the subject as measured by the photometric device 19, the position of the half mirror 14, and the sensitivity of the CCD 12 as determined by the gain of the AGC circuit 42. In the aperture-priority mode, the electronic shutter speed is determined on the basis of the aperture value specified by the user; in the shutter-priority mode, the aperture value is determined on the basis of the electronic shutter speed specified by the user. In the program mode, exposure control is achieved by determining the aperture value and the electronic shutter speed according to their relationship stored in the ROM 31a.

Figure 4A:
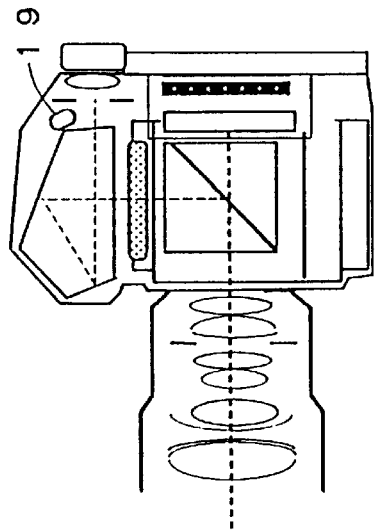
FIGS. 4A to 4D are sectional views of the digital camera of the first embodiment, as observed when shooting is performed at high sensitivity.
Figure 4B:
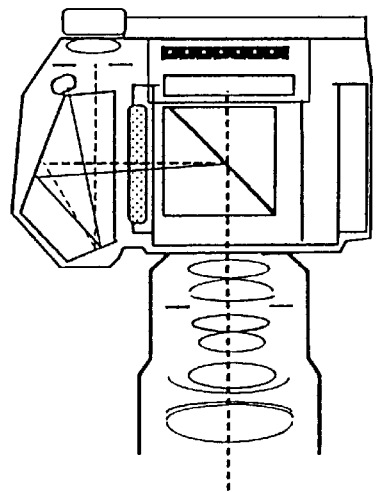

FIGS. 4A to 4D show sectional views of the digital camera 1 as observed when shooting is performed with the CCD 12 set at high sensitivity (ISO 200 to ISO 800). FIG. 4A shows the state when the signal S1 alone is being issued. Here, the half mirror 14 is in the intercepting position, and the photometric device 19 is performing photometry. The aperture stop 20 is fully open. FIG. 4B shows the state when the signal S2 has just been issued to request recording of an image. At this point, the half mirror 14 is in the intercepting position, but subsequently it moves to the retracted position. The photometric device 19 suspends photometry.

Figure 4C:
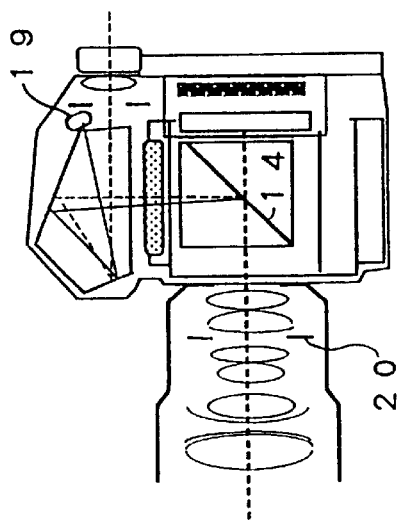
Figure 4D:
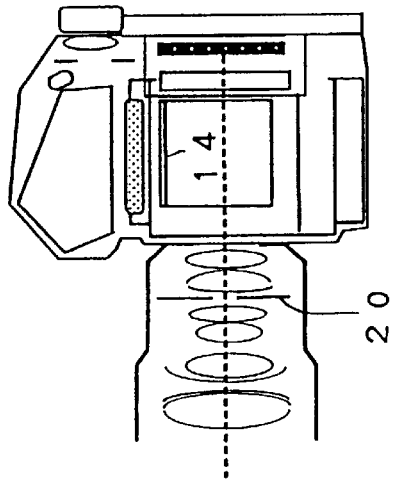

FIG. 4C shows the state when an image to be recorded is being shot. Here, the half mirror 14 is in the retracted position. The aperture stop 20 is stopped down according to, in the shutter-priority and program modes, the result of photometry performed in the state shown in FIG. 4A and, in the aperture-priority mode, an instruction from the user. FIG. 4D shows the state when the signal S1 is still present after completion of the shooting of the image to the recorded. Here, the half mirror 14 has moved back to the intercepting position, the photometric device 19 has restarted photometry, and the aperture stop 20 is fully open.

FIGS. 5A to 5D show sectional views of the digital camera 1 as observed when shooting is performed with the CCD 12 set at low sensitivity (ISO 50 or ISO 100).

Figure 5B:
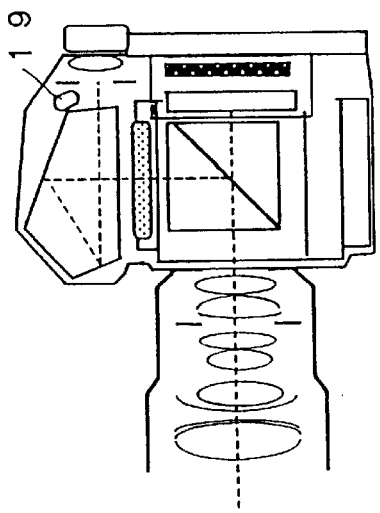
FIGS. 5A to 5D are sectional views of the digital camera of the first embodiment, as observed when shooting is performed at low sensitivity.
Figure 5D:
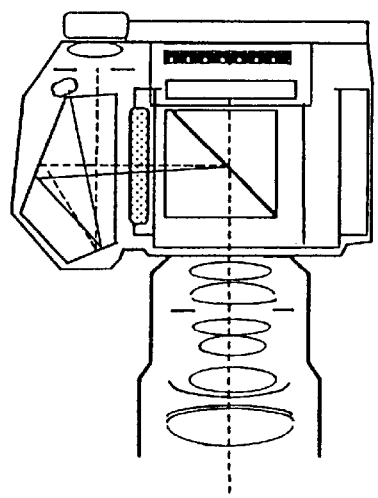
Figure 5A:
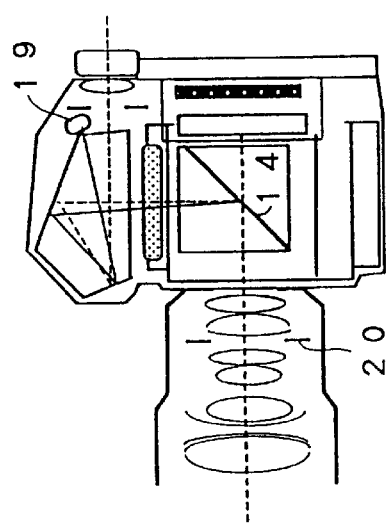
Figure 5C:
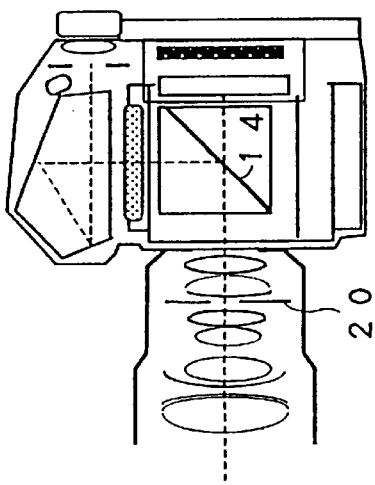

FIG. 5A shows the state when the signal S1 alone is being issued. FIG. 5B shows the state when the signal S2 has just been issued to request recording of an image. FIG. 5C shows the state when an image to be recorded is being shot. FIG. 5D shows the state when the signal S1 is still present after completion of the shooting of the image to the recorded. In this case, the half mirror 14 is kept in the intercepting position all the time. The photometric device 19 suspends photometry when the signal S2 is issued, and restarts photometry on completion of the shooting of the mage to be recorded. During the shooting of the image to be recorded, the aperture stop 20 is stopped down according to, in the shutter-priority and program modes, the result of photometry performed in the state shown in FIG. 5A and, in the aperture-priority mode, an instruction from the user.

As described above, in the digital camera 1, the sensitivity of the CCD 12 can be varied according to an instruction from the user, and an image to be recorded is shot with the position of the half mirror 14 changed and the output gain of the CCD 12 varied according to the sensitivity thus specified. This makes flexible exposure control possible irrespective of whether the subject is bright or dim. In particular, when the output gain of the CCD 12 is increased, the half mirror 14 is moved to the retracted position. This eliminates the need for an undue increase in the gain, and thus helps prevent an undue increase in noise. Thus, it is possible to obtain highquality images even when shooting is performed at high sensitivity.

Here, the adjustment of sensitivity of the CCD 12 is achieved by varying the gain of the AGC circuit 42. However, the same effect can be achieved by varying the slope of the line of the look-up table 44t used when the image CPU 44 performs gamma correction 44c. In that case, for example, a plurality of correction coefficients are stored beforehand in the image CPU 44, and one of those which corresponds to the currently specified sensitivity is selected. Photometry may be performed by the CCD 12 in place of the photometric device 19.

Now, the digital camera of a second embodiment of the invention will be described. In the digital camera 2 of this embodiment, sensitivity is switched automatically according to the brightness of the subject. This digital camera 2 has almost the same appearance and construction as the digital camera 1 shown in FIGS. 1 to 3, and therefore overlapping descriptions will not be repeated.

In the digital camera 2, when the brightness of the subject is equal to or higher than a predetermined level, shooting is performed with the half mirror 14 kept in the intercepting position, and, when the brightness of the subject is lower than the predetermined level, shooting is performed with the half mirror 14 kept in the retracted position. Since the user does not need to specify sensitivity, there is no need to display possible choices of sensitivity on the LCD 13 nor provide switches 22 to 24 for specifying sensitivity. Moreover, the control CPU 31 does not vary the gain of the AGC circuit 42, and thus sensitivity is switched in two steps.

Figure 6:
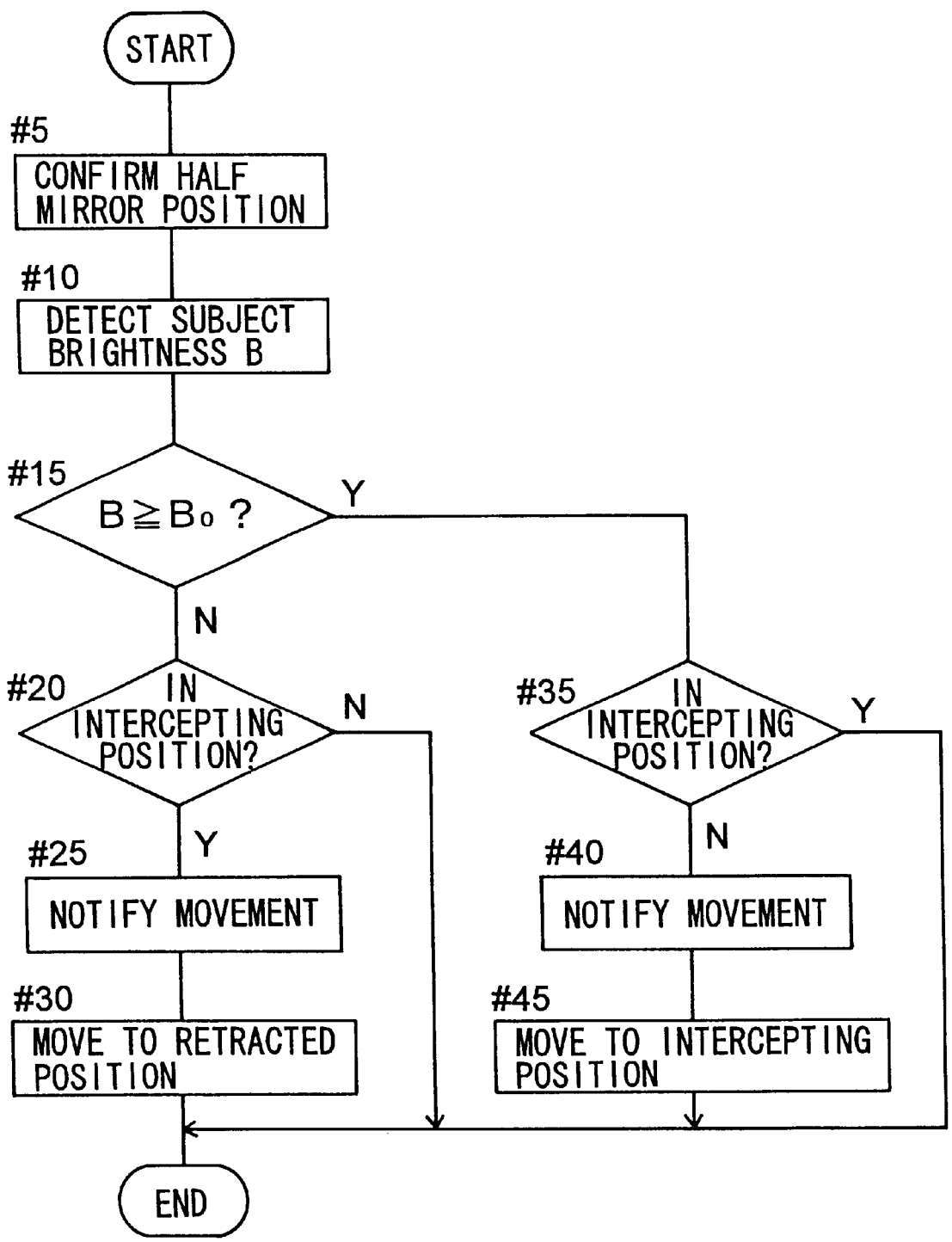
FIG. 6 s a flow chart showing the flow of control operations related to the setting of sensitivity of the digital camera of the second embodiment.

FIG. 6 shows the flow of control operations related to the setting of sensitivity.

First, the current position of the half mirror 14 is confirmed (step #5). Next, the brightness B of the subject is found (#10) on the basis of the output of the photometric device 19, and whether the detected brightness is equal to or higher than a predetermined value Bo is checked (#15). This predetermined value B0 is stored in the ROM 31a. If the brightness B of the subject is lower than the predetermined value B0, whether the half mirror is in the intercepting or retracted position is checked (#20), and, if the half mirror is in the intercepting position, it is moved to the retracted position (#30). Prior to this movement, a message reading "mirror up", for example, is superimposed on the image being displayed on the LCD 13 and on the image being observed through the optical viewfinder 15 to notify the user that the half mirror is going to be moved to the retracted position (#25). If, in #20, the half mirror is in the retracted position, it is kept in that position.

If, in #15, the brightness B of the subject is equal to or higher than the predetermined value B0, whether the half mirror is in the intercepting or retracted position is checked (#35), and, if the half mirror is in the retracted position, it is moved to the intercepting position (#45). Prior to this movement, a message reading "mirror down", for example, is superimposed on the image being displayed on the LCD 13 to notify the user that the half mirror is going to be moved to the intercepting position (#40). If, in #35, the half mirror is in the retracted position, it is kept in that position.

As a result of this control, when the subject is not very bright, all the light from the subject can be used for shooting, and thus it is possible to control exposure flexibly. For example, it is now easier to stop down the aperture stop further. On the other hand, when the subject is very bright, only part of the light from the subject is used for shooting, and thus, also in this case, it is possible to control exposure flexibly. For example, it is now easier to open the aperture stop closer to the fully open aperture.

The flow of control operations described above is executed on issuance of the signal S1. However, in cases where the live view displayed on the LCD 13 is too bright, the flow may be executed whenever the camera is ready for shooting (i.e. prior to issuance of the signal S1).

Obviously, many modifications and variations of the present invention are possible in light of the above teachings. It is therefore to be understood that within the scope of the appended claims, the invention may be practiced other than as specifically described.

What is claimed is:

1. An image-sensing apparatus comprising:
   a taking lens;
   an image-sensing device for shooting an image by receiving light from the taking lens;
   an optical member that can be moved between an intercepting position in which the optical member crosses an optical path from the taking lens to the image-sensing device and a retracted position in which the optical member lies off the optical path;
   a sensor for measuring brightness of a subject;
   an operation member operated by a user;
   a driver for positioning the optical member in the intercepting or retracted position according to an instruction fed in through the operation member; and
   a controller for adjusting, prior to the driver positioning the optical member according to said instruction, an amount of exposure of the image-sensing device according to an output of the sensor and the position to which the driver has been instructed to position the optical member,
   wherein the controller adjusts the amount of exposure a first amount if said optical member is in the intercepting position, and the controller adjusts the amount of exposure a second amount if the optical member is in the retracted position.

2. An image-sensing apparatus comprising:
   a taking lens;
   an image-sensing device for shooting an image by receiving light from the taking lens;
   an optical member that can be moved between an intercepting position in which the optical member crosses an optical path from the taking lens to the image-sensing device and a retracted position in which the optical member lies off the optical path;
   a sensor for measuring brightness of a subject;
   an operation member operated by a user;
   a driver for positioning the optical member in the intercepting or retracted position according to an instruction fed in through the operation member; and
   a controller for adjusting an amount of exposure of the image-sensing device according to an output of the sensor and the position of the optical member,
   wherein the controller adjusts the amount of exposure a first amount if said optical member is in the intercepting position, and the controller adjusts the amount of exposure a second amount if the optical member is in the retracted position, and
   wherein the optical member is a half mirror.

3. An image-sensing apparatus as claimed in claim 1, further comprising:
   an adjuster for adjusting intensity of a signal representing an image shot according to the position of the optical member,
   wherein the controller adjusts the amount of exposure of the image-sensing device according to the intensity of the signal adjusted by the adjuster.

4. An image-sensing apparatus as claimed in claim 3, wherein the adjuster makes the intensity of the signal higher when the optical member is in the retracted position than when the optical member is in the intercepting position.

5. An image-sensing apparatus comprising:
   a taking lens;
   an image-sensing device for shooting an image by receiving light from the taking lens;
   an optical member that can be moved between an intercepting position in which the optical member crosses an optical path from the taking lens to the image-sensing device and a retracted position in which the optical member lies off the optical path;
   a sensor for measuring brightness of a subject;
   an operation member operated by a user;
   a driver for positioning the optical member in the intercepting or retracted position according to an instruction fed in through the operation member;
   a controller for adjusting, prior to the driver positioning the optical member according to said instruction, an amount of exposure of the image-sensing device according to an output of the sensor and the position to which the driver has been instructed to position the optical member; and
   an adjuster for providing an amount of adjustment to the intensity of a signal representing an image shot according to the position to which the driver has been instructed to position the optical member,
   wherein the controller adjusts the amount of exposure of the image-sensing device according to said amount of adjustment to the intensity of the signal, and
   wherein the adjuster makes the intensity of the signal lower when the driver has been instructed to position the optical member in the retracted position than when the driver has been instructed to position the optical member in the intercepting position.

6. An image-sensing apparatus as claimed in claim 3, wherein the adjuster adjusts the intensity of the signal on a basis of transmittance of the optical member.

7. An image-sensing apparatus as claimed in claim 1, wherein the operation member is operated to feed in an instruction to set sensitivity of the image-sensing device.

8. An image-sensing apparatus as claimed in claim 1, further comprising:
   an optical viewfinder for offering a visible image by receiving light reflected from the optical member when the optical member is in the intercepting position.

9. In an image-sensing apparatus having a taking lens, an image-sensing device for shooting an image by receiving light from the taking lens, and an optical member that can be moved between an intercepting position in which the optical member crosses an optical path from the taking lens to the image-sensing device and a retracted position in which the optical member lies off the optical path, a method for controlling an amount of exposure of the image-sensing device, comprising:

a step of measuring brightness of a subject;

a step of receiving an instruction from outside;

a step of positioning the optical member in the intercepting or retracted position according to the instruction received from outside; and a step of setting, prior to positioning the optical member according to said instruction, the amount of exposure of the image-sensing device according to the measured brightness of the subject and the position to which the optical member is to be positioned, wherein the amount of exposure is set to a first amount if said optical member is in the intercepting position, and the amount of exposure is set to a second amount if the optical member is in the retracted position.

10. An image-sensing apparatus comprising:

a taking lens;

an image-sensing device for shooting an image by receiving light from the taking lens;

an optical member that can be moved between an intercepting position in which the optical member crosses an optical path from the taking lens to the image-sensing device and a retracted position in which the optical member lies off the optical path;

a sensor for measuring brightness of a subject; and a driver for positioning the optical member in the intercepting position when the brightness of the subject measured by the sensor is equal to or higher than a predetermined level and for positioning the optical member in the retracted position when the brightness of the subject measured by the sensor is lower than the predetermined level, wherein the optical member is a half mirror.

11. An image-sensing apparatus as claimed in claim 10, further comprising:

an optical viewfinder for offering a visible image by receiving light reflected from the optical member when the optical member is in the intercepting position.

12. An image-sensing apparatus as claimed in claim 10, further comprising:

a display for notifying a user of a change in the position of the optical member.

13. An image-sensing apparatus as claimed in claim 12, wherein the display also displays an image shot.

14. In an image-sensing apparatus having a taking lens, an image-sensing device for shooting an image by receiving light from the taking lens, and an optical member that can be moved between an intercepting position in which the optical member crosses an optical path from the taking lens to the image-sensing device and a retracted position in which the optical member lies off the optical path, a method for driving the optical member, comprising:

a step of measuring brightness of a subject;

a step of positioning the optical member in the intercepting position when the measured brightness of the subject is equal to or higher than a predetermined level; and a step of positioning the optical member in the retracted position when the measured brightness of the subject is lower than the predetermined level, wherein the optical member is a half mirror.

15. A camera comprising:

an image-sensing device for converting light received along an optical axis into an image data signal;

an optical member that can be moved to a plurality of positions including an intercepting position in which the optical member crosses said optical axis and a retracted position in which the optical member does not cross said optical axis;

a selector for allowing a user to select a level of sensitivity of the image-sensing device; and a driver for positioning the optical member in one of said plurality of positions based at least in part on the selected level of sensitivity.

16. A camera in accordance with claim 15, further comprising a processor for controlling the processing of said image data signal based at least in part on which of said plurality of positions said optical member is in.

17. A camera in accordance with claim 16, further comprising an automatic gain control circuit for adjusting a level of said image data signal according to a gain amount specified by the processor, wherein said processor specifies a gain amount based at least in part on which of said plurality of positions said optical member is in.

18. A camera in accordance with claim 17, wherein the processor calculates said gain amount based at least in part on a transmittance of the optical member when the optical member is in the intercepting position, and the processor neglects said transmittance of the optical member for calculating said gain amount when the optical member is in the retracted position.

19. A camera in accordance with claim 18, wherein the optical member is a half mirror.

* * * * *